(12) United States Patent
Ishiguchi

(10) Patent No.: US 10,700,356 B2
(45) Date of Patent: Jun. 30, 2020

(54) METHOD FOR PRODUCING PASTE FOR PRODUCTION OF NEGATIVE ELECTRODES, METHOD FOR PRODUCING NEGATIVE ELECTRODE FOR LITHIUM ION SECONDARY BATTERIES, NEGATIVE ELECTRODE FOR LITHIUM SECONDARY BATTERIES, AND LITHIUM ION SECONDARY BATTERY

(71) Applicant: NEC ENERGY DEVICES, LTD., Sagamihara-shi, Kanagawa (JP)

(72) Inventor: Kou Ishiguchi, Kanagawa (JP)

(73) Assignee: Envision AESC Energy Devices Ltd., Sagamihara-shi, Kanagawa (JP)

(*) Notice: Subject to any disclaimer, the term of this patent is extended or adjusted under 35 U.S.C. 154(b) by 291 days.

(21) Appl. No.: 15/533,889

(22) PCT Filed: Dec. 17, 2015

(86) PCT No.: PCT/JP2015/085337
§ 371 (c)(1),
(2) Date: Jun. 7, 2017

(87) PCT Pub. No.: WO2016/104315
PCT Pub. Date: Jun. 30, 2016

(65) Prior Publication Data
US 2017/0331110 A1    Nov. 16, 2017

(30) Foreign Application Priority Data
Dec. 24, 2014 (JP) .................................. 2014-261266

(51) Int. Cl.
*H01M 4/587* (2010.01)
*H01M 4/1393* (2010.01)
(Continued)

(52) U.S. Cl.
CPC ............ *H01M 4/587* (2013.01); *B01F 3/1214* (2013.01); *B01F 3/1221* (2013.01); *B01F 3/18* (2013.01);
(Continued)

(58) Field of Classification Search
None
See application file for complete search history.

(56) References Cited

U.S. PATENT DOCUMENTS

2012/0082892 A1* 4/2012 Kobayashi ............ H01M 4/134
429/211
2013/0193371 A1* 8/2013 Sumi ...................... H01M 4/04
252/182.1
(Continued)

FOREIGN PATENT DOCUMENTS

CN    102044661 A    5/2011
JP    1-320761    * 12/1989    ........... H01M 4/04
(Continued)

OTHER PUBLICATIONS

International Search Report of PCT/JP2015/085337 dated Mar. 8, 2016, [PCT/ISA/210].
(Continued)

*Primary Examiner* — Jeremiah R Smith
(74) *Attorney, Agent, or Firm* — Sughrue Mion, PLLC

(57) ABSTRACT

A method of producing a paste for production of a negative electrode of a lithium ion secondary battery, which includes a negative electrode active material, a thickening agent, and an aqueous binder. The method includes preparing a mixture containing the negative electrode active material and the thickening agent by dry mixing the negative electrode active material and the thickening agent in a powder state under reduced pressure; preparing a paste precursor by adding one or two or more kinds of liquid components selected from an
(Continued)

aqueous medium and an emulsion aqueous solution containing the aqueous binder to the mixture and wet mixing the mixture; and preparing the paste for production of a negative electrode by further adding one or two or more kinds of liquid components selected from the aqueous medium and the emulsion aqueous solution containing the aqueous binder to the paste precursor and wet mixing the mixture.

5 Claims, 2 Drawing Sheets

(51) Int. Cl.
| | |
|---|---|
| H01M 4/133 | (2010.01) |
| B01F 3/12 | (2006.01) |
| B01F 15/00 | (2006.01) |
| B01F 3/18 | (2006.01) |
| B01F 7/00 | (2006.01) |
| H01M 4/04 | (2006.01) |
| H01M 4/62 | (2006.01) |
| H01M 10/0525 | (2010.01) |
| H01M 4/02 | (2006.01) |
| H01M 4/583 | (2010.01) |
| H01M 4/139 | (2010.01) |

(52) U.S. Cl.
CPC .... *B01F 7/00991* (2013.01); *B01F 15/00253* (2013.01); *B01F 15/00389* (2013.01); *H01M 4/0404* (2013.01); *H01M 4/133* (2013.01); *H01M 4/1393* (2013.01); *H01M 4/622* (2013.01); *H01M 10/0525* (2013.01); *H01M 4/139* (2013.01); *H01M 4/583* (2013.01); *H01M 4/621* (2013.01); *H01M 4/625* (2013.01); *H01M 2004/021* (2013.01); *H01M 2004/027* (2013.01)

(56) References Cited

U.S. PATENT DOCUMENTS

| | | | |
|---|---|---|---|
| 2014/0363746 A1* | 12/2014 | He | H01M 10/052 |
| | | | 429/406 |
| 2015/0357648 A1* | 12/2015 | Sugimoto | H01M 4/139 |
| | | | 429/217 |
| 2016/0013473 A1 | 1/2016 | Ishiguchi | |
| 2017/0288204 A1* | 10/2017 | He | H01M 4/139 |

FOREIGN PATENT DOCUMENTS

| | | | | |
|---|---|---|---|---|
| JP | 11-213990 A | | 8/1999 | |
| JP | 2009-016265 | * | 1/2009 | ............ H01M 4/02 |
| JP | 2012-59488 A | | 3/2012 | |
| JP | 2013-093240 A | | 5/2013 | |
| JP | 2014-165131 A | | 9/2014 | |
| WO | 2014/141552 A1 | | 9/2014 | |

OTHER PUBLICATIONS

Written Opinion of PCT/JP2015/085337 dated Mar. 8, 2016, [PCT/ISA/237].
Communication dated Mar. 25, 2019 from the State Intellectual Property Office of the P.R.C in counterpart application No. 201580069501.8.

* cited by examiner

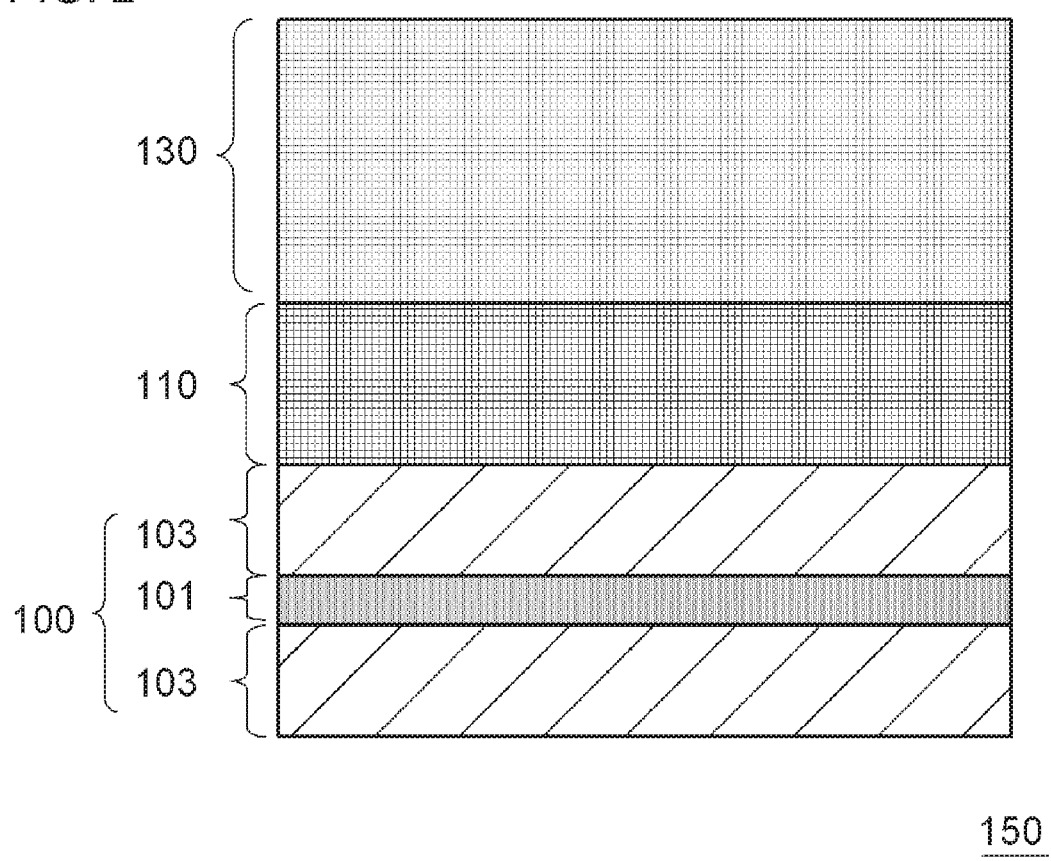

METHOD FOR PRODUCING PASTE FOR PRODUCTION OF NEGATIVE ELECTRODES, METHOD FOR PRODUCING NEGATIVE ELECTRODE FOR LITHIUM ION SECONDARY BATTERIES, NEGATIVE ELECTRODE FOR LITHIUM SECONDARY BATTERIES, AND LITHIUM ION SECONDARY BATTERY

CROSS REFERENCE TO RELATED APPLICATIONS

This application is a National Stage of International Application No. PCT/JP2015/085337 filed Dec. 17, 2015, claiming priority based on Japanese Patent Application No. 2014-261266 filed Dec. 24, 2014, the contents of all of which are incorporated herein by reference in their entirety.

TECHNICAL FIELD

The present invention relates to a method of producing a paste for production of a negative electrode, a method of producing a negative electrode for a lithium ion secondary battery, a negative electrode for a lithium ion secondary battery, and a lithium ion secondary battery.

BACKGROUND ART

A negative electrode used for a lithium ion secondary battery is mainly and typically configured of a negative electrode active material layer and a current collector. The negative electrode active material layer is obtained by coating the surface of the current collector such as copper foil with a paste for production of a negative electrode that includes a negative electrode active material, a thickening agent, and an aqueous binder and then drying the surface.

As a method of producing a negative electrode for a lithium ion secondary battery, the method described in Patent Document 1 is exemplified.

Patent Document 1 (Japanese Unexamined Patent Publication No. 2013-93240) describes a method of producing an electrode, including a powder mixing process (1) of mixing thickening agent powder and electrode active material powder; a kneading process (2) of kneading a powder mixture obtained from the powder mixing process and water; a thickening agent aqueous solution mixing process (3) of mixing the kneaded material obtained from the kneaded process and a thickening agent aqueous solution to obtain a paste for forming an electrode active material layer; and a process (4) of applying the paste for forming an electrode active material layer to an electrode current collector to form an electrode active material layer on the current collector.

Patent Document 1 describes that a secondary battery which has lower battery resistance and excellent durability and from which an electrode active material layer is unlikely to be peeled off can be provided by means of using the method of producing an electrode which includes the above-described processes (1) to (4).

RELATED DOCUMENT

Patent Document

[Patent Document 1] Japanese Unexamined Patent Publication No. 2013-93240

SUMMARY OF THE INVENTION

Technical Problem

According to the research conducted by the present inventors, it became evident that pinholes are occasionally generated in a negative electrode for a lithium ion secondary battery obtained by the production method described in Patent Document 1. Since a current collector is exposed when pinholes are generated, there is a concern that metal lithium is deposited on the current collector so that the battery life is reduced. Therefore, generation of pinholes in a negative electrode is not desirable.

The present invention has been made in consideration of the above-described circumstances and an object thereof is to provide a paste for production of a negative electrode which is capable of stably obtaining a negative electrode for a lithium ion secondary battery in which generation of pinholes is suppressed.

Solution to Problem

The present inventors conducted intensive research in order to achieve the above-described object. As the result, it was found that a negative electrode for a lithium ion secondary battery in which generation of pinholes is suppressed can be stably obtained by preparing a paste after the negative electrode active material and the thickening agent are dry-mixed in a powder state under reduced pressure, thereby completing the present invention.

According to the present invention, there is provided a method of producing a paste for production of a negative electrode of a lithium ion secondary battery, the paste containing a negative electrode active material, a thickening agent, and an aqueous binder, the method including: a process (A) of preparing a mixture containing the negative electrode active material and the thickening agent by dry mixing the negative electrode active material and the thickening agent in a powder state under reduced pressure; a process (B) of preparing a paste precursor by adding one or two or more kinds of liquid components selected from an aqueous medium and an emulsion aqueous solution containing the aqueous binder to the mixture and wet mixing the mixture; and a process (C) of preparing the paste for production of a negative electrode by further adding one or two or more kinds of liquid components selected from the aqueous medium and the emulsion aqueous solution containing the aqueous binder to the paste precursor and wet mixing the mixture.

Further, according to the present invention, there is provided a method of producing a negative electrode for a lithium ion secondary battery, the negative electrode containing a negative electrode active material, a thickening agent, and an aqueous binder, the method including: a process of preparing a paste for production of a negative electrode according to the method of producing a paste for production of a negative electrode; and a process of forming a negative electrode using the obtained paste for production of a negative electrode.

Further, according to the present invention, there is provided a negative electrode for a lithium ion secondary battery which is obtained by the method of producing a negative electrode for a lithium ion secondary battery.

Further, according to the present invention, there is provided a lithium ion secondary battery including at least: the negative electrode for a lithium ion secondary battery; an electrolyte; and a positive electrode.

Advantageous Effects of Invention

According to the present invention, it is possible to provide a paste for production of a negative electrode which is capable of stably obtaining a negative electrode for a lithium ion secondary battery in which generation of pinholes is suppressed.

BRIEF DESCRIPTION OF THE DRAWINGS

The above-described purposes, other objects, features, and advantages will become more apparent from the following preferred embodiments and the accompanying drawings.

FIG. 2 is a cross-sectional view illustrating an example of a structure of a lithium ion secondary battery according to the embodiment of the present invention.

DESCRIPTION OF EMBODIMENTS

Figure 1:
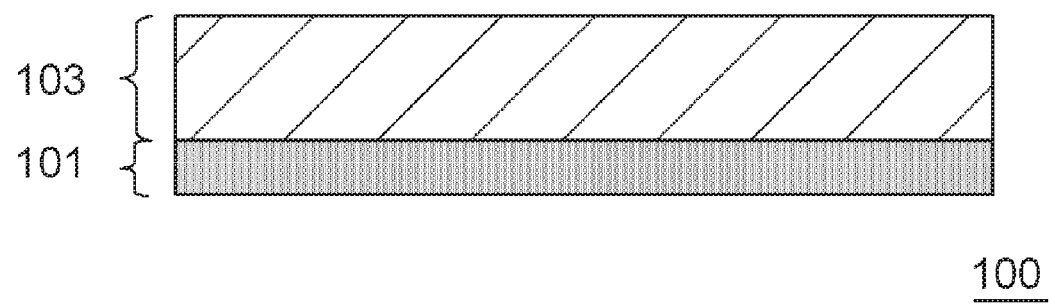
FIG. 1 is a cross-sectional view illustrating an example of a structure of a negative electrode for a lithium ion secondary battery according to an embodiment of the present invention.

Hereinafter, embodiments of the present invention will be described with reference to the accompanying drawings. Further, in all drawings, the same constituent elements are denoted by the same reference numerals and the description thereof will not be repeated. Further, in each constituent element of the drawings, the shape, the size, and the positional relationship are schematically illustrated to facilitate understanding of the present invention and thus differ from the actual ones.

In addition, in the present embodiment, a layer containing a negative electrode active material is referred to as a negative electrode active material layer and a current collector on which a negative electrode active material layer is formed is referred to as a negative electrode unless otherwise noted. Further, "to" in a numerical range indicates that the range includes the upper limit and the lower limit unless otherwise noted.

A method of producing a paste for production of a negative electrode according to the present embodiment is a method of producing a paste for production of a negative electrode of a lithium ion secondary battery, the paste containing a negative electrode active material (a), a thickening agent (b), and an aqueous binder (c) and includes at least the following process (A), process (B), and process (C).

A process (A): a process of preparing a mixture containing the negative electrode active material (a) and the thickening agent (b) by dry mixing the negative electrode active material (a) and the thickening agent (b) in a powder state under reduced pressure A process (B): a process of preparing a paste precursor by adding one or two or more kinds of liquid components selected from an aqueous medium and an emulsion aqueous solution containing the aqueous binder (c) to the mixture and wet mixing the mixture A process (C): a process of preparing the paste for production of a negative electrode by further adding one or two or more kinds of liquid components selected from the aqueous medium and the emulsion aqueous solution containing the aqueous binder (c) to the paste precursor and wet mixing the mixture <Constituent Material of Paste for Production of a Negative Electrode>

First, each constituent material used for the method of producing a paste for production of a negative electrode according to the present embodiment will be described.

(Negative Electrode Active Material (a))

The negative electrode active material (a) is not particularly limited as long as the negative electrode active material is typically used for a negative electrode of a lithium ion secondary battery. Examples thereof include carbon materials such as natural graphite, artificial graphite, resin charcoal, carbon fibers, activated carbon, hard carbon, and soft carbon; lithium-based metals such as lithium metal and a lithium alloy; metals such as silicon and tin; and conductive polymers such as polyacene, polyacetylene, and polypyrrole. Among these, carbon materials are preferable and graphite materials such as natural graphite and artificial graphite are particularly preferable.

The graphite material is not particularly limited as long as the graphite material is typically used for a negative electrode of a lithium ion secondary battery. Examples thereof include natural graphite and artificial graphite produced by performing a heat treatment on petroleum-based coke and coal-based coke.

Here, the natural graphite indicates graphite naturally produced as an ore. In the natural graphite used as a core material of the present embodiment, the production area, the property, and the type thereof are not particularly limited.

Further, the artificial graphite indicates graphite created by an artificial technique or graphite close to a perfect crystal of graphite. Such artificial graphite is obtained by performing a baking process and a graphitization process using, as raw materials, tar and coke obtained from residues or the like resulting from dry distillation of coal or distillation of crude oil.

In addition, as the graphite material, a material (hereinafter, also referred to as surface-coated graphite) which has graphite powder as a core material and in which at least apart of the surface of the graphite powder is coated with a carbon material with a crystallinity lower than that of the graphite powder is preferable. It is particularly preferable that the edge portion of graphite powder is coated with the carbon material. When the edge portion of the graphite powder is coated, an irreversible reaction between the edge portion and the electrolytic solution can be suppressed. As the result, a degradation in initial charge and discharge efficiency due to an increase of the irreversible capacity can be suppressed.

In addition, when the surface-coated graphite is used, the amount of a binder can be reduced since bonding properties between the graphite and the binder can be improved compared to the case where graphite is used alone. As the result, the battery characteristics of a lithium ion secondary battery to be obtained can be improved.

Here, the carbon material having a crystallinity lower than that of the graphite powder is amorphous carbon such as soft carbon or hard carbon.

Examples of the graphite powder used as a core material include natural graphite and artificial graphite produced by performing a heat treatment on petroleum-based coke and coal-based coke. In the present embodiment, the graphite powder can be used alone or in combination of two or more kinds thereof. Among these, from the viewpoint of the cost, natural graphite is preferable.

The surface-coated graphite of the present embodiment can be prepared by mixing the graphite powder and an organic compound that is carbonized by a baking process and becomes a carbon material having a crystallinity lower than that of the graphite powder and then baking and carbonizing the organic compound.

The organic compound mixed with the graphite powder is not particularly limited as long as the organic compound is carbonized by baking to obtain a carbon material having a crystallinity lower than that of the graphite powder. Examples thereof include tar such as petroleum-based tar or coal-based tar; pitch such as petroleum-based pitch or coal-based pitch; a thermoplastic resin such as polyvinyl chloride, polyvinyl acetate, polyvinyl butyral, polyvinyl alcohol, polyvinylidene chloride, or polyacrylonitrile; a thermosetting resin such as a phenol resin or a furfuryl alcohol resin; a natural resin such as cellulose; and aromatic hydrocarbon such as naphthalene, alkyl naphthalene, or anthracene.

In the present embodiment, these organic compounds may be used alone or in combination of two or more kinds thereof. Further, these organic compounds may be used by being dissolved or dispersed using a solvent as necessary.

Among the above-described organic compounds, tar and pitch are preferable from the viewpoint of the cost.

The proportion (hereinafter, referred to as a "coating amount") of the carbon material derived from an organic compound in the surface-coated graphite of the present embodiment is preferably equal to or greater than 0.7% by mass and equal to or less than 8.0% by mass when the amount of the negative electrode active material is set to 100% by mass.

When the coating amount of the carbon material is set to be equal to or less than the upper limit, the area for storing or releasing lithium ions is increased and thus the rate characteristics of the lithium ion secondary battery to be obtained can be improved.

When the coating amount of the carbon material is set to be equal to or greater than the lower limit, a degradation in initial charge and discharge efficiency due to an increase of irreversible capacity can be suppressed. Further, when the coating amount of the carbon material is set to be equal to or greater than the lower limit, the stability of the paste for production of a negative electrode to be obtained can be improved.

Here, the above-described coating amount can be calculated by thermogravimetric analysis. More specifically, the mass decreased in a temperature range from when the mass decrease is started, the rate of mass decrease becomes moderate, and to when the mass decrease is accelerated when the negative electrode active material is heated to 900° C. at a temperature rising rate of 5° C./min in an oxygen atmosphere using a thermogravimetric analyzer (for example, TGA7 analyzer manufactured by PerkinElmer, Inc.) can be set as a coating amount.

The specific surface area of the negative electrode active material (a) according to a nitrogen adsorption BET method is preferably equal to or greater than 1.0 $m^2/g$ and equal to or less than 6.0 $m^2/g$ and more preferably equal to or greater than 2.0 $m^2/g$ and equal to or less than 5.0 $m^2/g$.

When the specific surface area is set to be equal to or less than the upper limit, a degradation in initial charge and discharge efficiency due to an increase of irreversible capacity can be suppressed. Further, when the specific surface area is set to be equal to or less than the upper limit, the stability of the paste for production of a negative electrode to be obtained can be improved.

When the specific surface area is set to be equal to or greater than the lower limit, the area for storing or releasing lithium ions is increased and thus the rate characteristics of the lithium ion secondary battery to be obtained can be improved.

Further, when the specific surface area is set to be in the above-described range, the bonding properties of the aqueous binder (c) can be improved.

An average particle diameter $d_{50}$ of the negative electrode active material (a) in volume-based particle size distribution according to a laser diffraction scattering particle size distribution measurement method is not particularly limited, but is preferably equal to or greater than 10 μm and equal to or less than 30 μm and more preferably equal to or greater than 15 μm and equal to or less than 25 μm. The average particle diameter $d_{50}$ is in the above-described range, the balance between bonding properties and dispersibility of the active material is further improved.

A hardness (R) of the negative electrode active material (a) to be measured by the following procedures (1) and (2) is preferably 0.70 $t/cm^2$ or greater and more preferably 0.90 $t/cm^2$ or greater.

(1) A cylinder having a diameter of 3 cm and a height of 15 cm is filled with 30 g of powder of the negative electrode active material (a)

(2) A pressure is applied to the powder of the negative electrode active material (a) filling the cylinder and the pressure when a filling density of the negative electrode active material (a) becomes 1.50 $g/cm^3$ is set as the hardness (R) of the negative electrode active material (a)

According to the research conducted by the present inventors, it became evident that the negative electrode active material (a) is cracked or chipped when the stirring rate in the process (B) is increased to strengthen the shearing force with respect to the paste or the mixing time is increased in order to disintegrate a gel component derived from the thickening agent (b). When the negative electrode active material (a) is cracked or chipped, there is a concern that decomposition of an electrolytic solution occurs in the cracked or chipped portion so that the life of the lithium ion secondary battery to be obtained is reduced or a gas is generated in the battery.

For this reason, as the result of intensive research conducted by the present inventors, it is newly discovered that the occurrence of cracking or chipping in the negative electrode active material (a) can be suppressed, by means of using the negative electrode active material (a) in which the hardness (R) is equal to or greater than the lower limit described above, even when the stirring rate in the process (B) is increased to strengthen the shearing strength with respect to the paste or the mixing time is increased.

In other words, when the negative electrode active material (a) in which the hardness (R) is equal to or greater than the lower limit described above is used, it is possible to obtain a paste for production of a negative electrode capable of stably obtaining a negative electrode for a lithium ion secondary battery in which generation of pinholes is suppressed and occurrence of cracking or chipping in the negative electrode active material (a) is suppressed.

The amount of the negative electrode active material (a) to be used is preferably equal to or greater than 94 parts by mass and equal to or less than 98.9 parts by mass and more preferably equal to or greater than 95 parts by mass and equal to or less than 97.9 parts by mass when the total amount of the solid content of the paste for production of a negative electrode according to the present embodiment is set to 100 parts by mass.

(Thickening Agent (b))

The thickening agent (b) is not particularly limited as long as the thickening agent improves the coatability of the paste for production of a negative electrode. Examples of the thickening agent (b) includes water-soluble polymers, for example, a cellulose-based polymer such as carboxymethyl cellulose, methyl cellulose, or hydroxypropyl cellulose, ammonium salts of these, and alkali metal salts; polycarboxylic acid; polyethylene oxide; polyvinyl pyrrolidone; polyacrylate such as sodium polyacrylate; and polyvinyl alcohol.

Among these, at least one selected from the group consisting of a cellulose-based polymer, an ammonium salt of a cellulose-based polymer, and an alkali metal salt of a cellulose-based polymer is preferable and carboxymethyl cellulose, an ammonium salt of carboxymethyl cellulose, and an alkali metal salt of carboxymethyl cellulose are more preferable.

The thickening agent (b) exemplified above may be used alone or in combination of two or more kinds thereof. The amount of the thickening agent (b) to be used is preferably equal to or greater than 0.5 parts by mass and equal to or less than 2.0 parts by mass, more preferably equal to or greater than 0.7 parts by mass and equal to or less than 1.7 parts by mass, and still more preferably equal to or greater than 0.7 parts by mass and equal to or less than 1.5 parts by mass when the total amount of the solid content of the paste for production of a negative electrode is set to 100 parts by mass. When the amount of the thickening agent (b) to be used is in the above-described range, the balance between the coatability of the paste for production of a negative electrode and bonding properties of the binder becomes more excellent.

(Aqueous Binder (c))

The aqueous binder (c) is not particularly limited as long as the aqueous binder is capable of forming an electrode and sufficiently has electrochemical stability, and examples thereof include polyacrylic acid, polytetrafluoroethylene, polyvinylidene fluoride, styrene butadiene rubber, and polyimide. These aqueous binders (c) may be used alone or in combination of two or more kinds thereof. Among these, styrene butadiene rubber is preferable.

Further, in the present embodiment, the aqueous binder (c) indicates a binder that is dispersed in an aqueous medium and is capable of forming an emulsion aqueous solution.

The amount of the aqueous binder (c) is preferably equal to or greater than 0.5 parts by mass and equal to or less than 3.0 parts by mass and more preferably equal to or greater than 1.0 part by mass and equal to or less than 2.5 parts by mass when the total amount of the solid content of the paste for production of a negative electrode is set to 100 parts by mass.

The aqueous binder (c) is used as an emulsion aqueous solution by dispersing a powder binder in an aqueous medium. In this manner, the contact between negative electrode active materials (a), between conductive assistants (d), and between the negative electrode active material (a) and the conductive assistant (d) is not inhibited and the dispersibility of the aqueous binder (c) can be improved.

The aqueous medium that disperses the aqueous binder (c) is not particularly limited as long as the aqueous binder (c) can be dispersed therein, and examples thereof include distilled water, ion exchange water, city water, and industrial water. Among these, distilled water or ion exchange water is preferable. Further, a solvent having a high affinity for water such as alcohol may be mixed into water.

(Conductive Assistant (d))

The conductive assistant (d) may be further added to the paste for production of a negative electrode according to the present embodiment.

The conductive assistant (d) has electron conductivity and is not particularly limited as long as the conductive assistant improves the conductivity of an electrode. Examples of the conductive assistant (d) of the present embodiment include carbon materials such as acetylene black, Ketjenblack, carbon black, carbon nanofibers, and graphite having a particle diameter smaller than that of graphite used as an active material. These conductive assistants (d) may be used alone or in combination of two or more kinds thereof.

The amount of the conductive assistant (d) is preferably equal to or greater than 0.1 parts by mass and equal to or less than 2.0 parts by mass and more preferably equal to or greater than 0.3 parts by mass and equal to or less than 1.2 parts by mass when the total amount of the solid content of the paste for production of a negative electrode is set to 100 parts by mass.

When the amount of the conductive assistant to be used is in the above-described range, the balance between the coatability of the paste for production of a negative electrode and bonding properties of the binder becomes more excellent.

(Aqueous Medium)

The aqueous medium is not particularly limited and examples thereof include distilled water, ion exchange water, city water, and industrial water. Among these, distilled water or ion exchange water is preferable. Further, a solvent having a high affinity for water such as alcohol may be mixed into water.

<Method of Producing Paste for Production of Negative Electrode>

Next, the method of producing a paste for production of a negative electrode according to the present embodiment will be described.

The method of producing a paste for production of a negative electrode according to the present embodiment is a method of producing a paste for production of a negative electrode of a lithium ion secondary battery, the paste containing a negative electrode active material (a), a thickening agent (b), and an aqueous binder (c) and includes at least the following process (A), process (B), and process (C).

A process (A): a process of preparing a mixture containing the negative electrode active material (a) and the thickening agent (b) by dry mixing the negative electrode active material (a) and the thickening agent (b) in a powder state under reduced pressure A process (B): a process of preparing a paste precursor by adding one or two or more kinds of liquid components selected from an aqueous medium and an emulsion aqueous solution containing the aqueous binder (c) to the mixture and wet mixing the mixture A process (C): a process of preparing the paste for production of a negative electrode by further adding one or two or more kinds of liquid components selected from the aqueous medium and the emulsion aqueous solution containing the aqueous binder (c) to the paste precursor and wet mixing the mixture Hereinafter, each process will be described.

[Process (A) of Preparing Mixture]

In the process (A) of preparing a mixture, a mixture of powder is prepared by dry mixing the negative electrode active material (a) and the thickening agent (b) in a powder state under reduced pressure. At this time, the negative electrode active material (a) and the thickening agent (b) may be mixed together with the conductive assistant (d) in a powder state.

In the present embodiment, the dispersibility of the negative electrode active material (a) and the thickening agent (b) can be improved by performing the process (A) under reduced pressure and generation of a gel component derived from the thickening agent (b) can be suppressed in the process (B). Therefore, generation of a gel component derived from the thickening agent (b) in the paste for production of a negative electrode to be obtained can be suppressed.

According to the research of the present inventors, it became evident that pinholes may be generated in the negative electrode for a lithium ion secondary battery to be obtained in the paste for production of a negative electrode obtained by the production method including the process of dry mixing the negative electrode active material (a) and the thickening agent (b) in a powder state and a gel component derived from the thickening agent (b) is present in the paste used for production of a negative electrode in which pinholes are generated.

For this reason, the present inventors conducted intensive research. As the result, it was found that the dispersibility of the negative electrode active material (a) and the thickening agent (b) can be improved by performing the process (A) under reduced pressure and thus generation of a gel component derived from the thickening agent (b) can be suppressed in the process (B) and a paste for production of a negative electrode with less gel components derived from the thickening agent (b) can be stably obtained. In addition, it was found that a negative electrode for a lithium ion secondary battery in which generation of pinholes is suppressed can be stably obtained by using the paste for production of a negative electrode obtained in the above-described manner, thereby attaining the present invention.

As a mixer that performs the dry mixing, it is preferable to use a planetary motion type mixer and more preferable to use a planetary motion type planetary mixer. When such a mixer is used, the negative electrode active material (a) and the thickening agent (b) can be sufficiently mixed with each other while suppressing scattering of the negative electrode active material (a) and the thickening agent (b). Further, the planetary motion type mixer indicates a mixer having a rotation function and a revolution function as a stirring mechanism. The planetary motion type planetary mixer indicates a mixer that includes a blade having a rotation function and a revolution function as a stirring mechanism.

The pressure inside the mixer in the process (A) is preferably −0.01 MPa or less and more preferably −0.07 MPa or less. In this manner, the dispersibility of the negative electrode active material (a) and the thickening agent (b) can be further improved and the generation of a gel component derived from the thickening agent can be further suppressed in the process (B). Accordingly, the generation of a gel component derived from the thickening agent (b) in the paste for production of a negative electrode to be obtained can be further suppressed.

The lower limit of the pressure inside of the mixer in the process (A) is not particularly limited, but is typically −0.10 MPa or greater.

The rotating velocity of the dry mixing in the process (A) is preferably equal to or greater than 0.10 m/sec and equal to or less than 0.30 m/sec and more preferably equal to or greater than 0.17 m/sec and equal to or less than 0.26 m/sec.

When the rotating velocity of the dry mixing in the process (A) is in the above-described range, the negative electrode active material (a) and the thickening agent (b) can be sufficiently mixed with each other while suppressing scattering of the negative electrode active material (a) and the thickening agent (b).

The revolution velocity of the dry mixing in the process (A) is preferably equal to or greater than 0.03 m/sec and equal to or less than 0.10 m/sec and more preferably equal to or greater than 0.05 m/sec and equal to or less than 0.09 m/sec.

When the revolution velocity of the dry mixing in the process (A) is in the above-described range, the negative electrode active material (a) and the thickening agent (b) can be sufficiently mixed with each other while suppressing scattering of the negative electrode active material (a) and the thickening agent (b).

The mixing time of the dry mixing in the process (A) is not particularly limited, but is typically equal to or longer than 30 minutes and equal to or shorter than 120 minutes and preferably equal to or longer than 45 minutes and equal to or shorter than 90 minutes.

[Process (B) of Preparing Paste Precursor]

In the process (B) of preparing the paste precursor, a paste precursor is prepared by adding one or two or more kinds of liquid components selected from an aqueous medium and an emulsion aqueous solution containing the aqueous binder (c) to the mixture obtained from the process (A) and wet mixing the mixture.

It is preferable that the process (B) includes a blending process (B1) and a solid kneading process (B2). The blending process (B1) is a process of blending one or two or more kinds of liquid components selected from an aqueous medium and an emulsion aqueous solution containing the aqueous binder (c) with the powder mixture. When the process (B) includes this blending process (B1), it is possible to prevent the powder mixture from gradually rising on the edge of the mixer during the wet mixing, wetting of the powder mixture from being biased, and the powder mixture from scattering at the time of kneading.

In addition, the solid kneading process (B2) is a process of setting the rotating velocity of the wet mixing to be higher than that of the blending process (B1) and kneading the powder mixture and the liquid component to obtain a paste precursor.

As a mixer that performs the wet mixing, in the process (B), it is preferable to use a planetary motion type mixer and more preferable to use a planetary motion type planetary mixer. When such a mixer is used, the dispersibility of each material can be improved while suppressing scattering of each material constituting the paste for production of a negative electrode.

The rotating velocity of the wet mixing in the blending process (B1) is preferably equal to or greater than 0.10 m/sec and equal to or less than 0.50 m/sec and more preferably equal to or greater than 0.15 m/sec and equal to or less than 0.20 m/sec.

When the rotating velocity of the wet mixing in the blending process (B1) is in the above-described range, it is possible to sufficiently blending the liquid component with the powder mixture while preventing the powder mixture from gradually rising on the edge of the mixer during the wet mixing, wetting of the powder mixture from being biased, and the powder mixture from scattering at the time of kneading.

The revolution velocity of the wet mixing in the blending process (B1) is preferably equal to or greater than 0.03 m/sec and equal to or less than 0.06 m/sec and more preferably equal to or greater than 0.04 m/sec and equal to or less than 0.06 m/sec.

When the revolution velocity of the wet mixing in the blending process (B1) is in the above-described range, it is possible to sufficiently blending the liquid component with the powder mixture while preventing the powder mixture from gradually rising on the edge of the mixer during the wet mixing, wetting of the powder mixture from being biased, and the powder mixture from scattering at the time of kneading.

The mixing time of the wet mixing in the blending process (B1) is not particularly limited, but is typically equal to or longer than 0.5 minutes and equal to or shorter than 10 minutes and preferably equal to or longer than 2 minutes and equal to or shorter than 5 minutes.

The rotating velocity of the wet mixing in the solid kneading process (B2) is preferably equal to or greater than 3.00 m/sec and equal to or less than 5.00 m/sec and more preferably equal to or greater than 4.20 m/sec and equal to or less than 4.50 m/sec.

When the rotating velocity of the wet mixing in the solid kneading process (B2) is in the above-described range, since the shearing force applied to the paste precursor can be set to be more moderate, a gel component derived from the thickening agent (b) can be more easily disintegrated while suppressing cutting of a molecular chain of the thickening agent (b) and the generation of a gel component derived from the thickening agent (b) in the paste for production of a negative electrode to be obtained can be further suppressed.

The revolution velocity of the wet mixing in the solid kneading process (B2) is preferably equal to or greater than 1.00 m/sec and equal to or less than 1.60 m/sec and more preferably equal to or greater than 1.30 m/sec and equal to or less than 1.50 m/sec.

When the revolution velocity of the wet mixing in the solid kneading process (B2) is in the above-described range, since the shearing force applied to the paste precursor can be set to be more moderate, a gel component derived from the thickening agent (b) can be more easily disintegrated while suppressing cutting of a molecular chain of the thickening agent (b) and the generation of a gel component derived from the thickening agent (b) in the paste for production of a negative electrode to be obtained can be further suppressed.

The mixing time of the wet mixing in the solid kneading process (B2) is not particularly limited, but is typically equal to or longer than 20 minutes and equal to or shorter than 120 minutes.

It is preferable that the solid content concentration of the paste precursor in the process (B) is adjusted to be preferably equal to or greater than 55.0% by mass and equal to or less than 65.0% by mass and more preferably equal to or greater than 61.0% by mass and equal to or less than 63.0% by mass. In this manner, since the shearing force applied to the paste precursor can be set to be more moderate, the dispersibility of each material can be improved while suppressing cutting of a molecular chain of the thickening agent (b).

The solid content concentration of the paste precursor can be adjusted by adjusting the concentration of the liquid component or the amount of the liquid component to be added.

[Process (C) of Preparing Paste for Production of Negative Electrode]

In the process (C) of preparing the paste for production of a negative electrode, the paste for production of a negative electrode is prepared by further adding one or two or more kinds of liquid components selected from the aqueous medium and the emulsion aqueous solution containing the aqueous binder (c) to the paste precursor obtained from the process (B) and wet mixing the mixture.

As a mixer that performs the wet mixing, it is preferable to use a planetary motion type mixer and more preferable to use a planetary motion type planetary mixer. When such a mixer is used, the mixture can be sufficiently mixed while stirring at a low speed. Therefore, the dispersibility of each material constituting the paste for production of a negative electrode can be improved while suppressing cutting of a molecular chain of the thickening agent (b) due to the stirring and the mixing and suppressing aggregation of aqueous binders (c). As the result, it is possible to obtain a paste for production of a negative electrode having more excellent storage stability.

Moreover, since the paste for production of a negative electrode to be obtained has more excellent dispersibility, a more uniform negative electrode active material layer can be obtained when such a paste for production of a negative electrode is used. As the result, it is possible to obtain a lithium ion secondary battery having more excellent battery characteristics.

The rotating velocity of the wet mixing in the process (C) is preferably equal to or greater than 0.12 m/sec and equal to or less than 0.30 m/sec and more preferably equal to or greater than 0.13 m/sec and equal to or less than 0.26 m/sec.

When the rotating velocity of the wet mixing in the process (C) is in the above-described range, the dispersibility of each material constituting the paste for production of a negative electrode can be improved while suppressing cutting of a molecular chain of the thickening agent (b) due to the stirring and the mixing and further suppressing aggregation of aqueous binders (c).

Further, the revolution velocity of the wet mixing in the process (C) is preferably equal to or greater than 0.04 m/sec and equal to or less than 0.10 m/sec and more preferably equal to or greater than 0.05 m/sec and equal to or less than 0.09 m/sec.

When the revolution velocity of the wet mixing in the process (C) is in the above-described range, the dispersibility of each material constituting the paste for production of a negative electrode can be improved while suppressing cutting of a molecular chain of the thickening agent (b) due to the stirring and the mixing and further suppressing aggregation of aqueous binders (c).

In the present embodiment, it is preferable that the rotating velocity of the wet mixing in the process (C) is set to be lower than the rotating velocity of the wet mixing in the solid kneading process (B2). In this manner, the dispersibility of each material constituting the paste for production of a negative electrode can be improved while further suppressing aggregation of aqueous binders (c) due to the stirring and the mixing.

Further, in the present embodiment, it is preferable that the revolution velocity of the wet mixing in the process (C) is set to be lower than the revolution velocity of the wet mixing in the solid kneading process (B2). In this manner, the dispersibility of each material constituting the paste for production of a negative electrode can be improved while further suppressing aggregation of aqueous binders (c) due to the stirring and the mixing.

The mixing time of the wet mixing in the process (C) is not particularly limited, but is typically equal to or longer than 5 minutes and equal to or shorter than 30 minutes.

In addition, the solid content concentration of the paste for production of a negative electrode can be adjusted by adjusting the concentration of the liquid component or the amount of the liquid component to be added.

[Process (D) of Vacuum Defoaming]

The method of producing a paste for production of a negative electrode according to the present embodiment may further include a process (D) of vacuum defoaming. In this manner, bubbles having entered the paste can be removed and the coatability of the paste can be improved.

In the process of vacuum deforming, bubbles may be removed by applying a sealing treatment on a container or a shaft portion of the mixer or may be removed after being transferred to another container.

<Method of Producing Negative Electrode for Lithium Ion Secondary Battery>

Next, a method of producing a negative electrode 100 for a lithium ion secondary battery according to the present embodiment will be described. FIG. 1 is a cross-sectional view illustrating an example of the structure of the negative electrode 100 for a lithium ion secondary battery according to the embodiment of the present invention.

The method of producing the negative electrode 100 for a lithium ion secondary battery of the present embodiment includes at least the following two processes (1) and (2).

(1) A process of preparing a paste for production of a negative electrode according to the method of producing a paste for production of a negative electrode (2) A process of forming the negative electrode 100 for a lithium ion secondary battery using the obtained paste for production of a negative electrode Hereinafter, each process will be described.

[Process (1) of Preparing Paste for Production of Negative Electrode]

In the process (1) of preparing a paste for production of a negative electrode of the present embodiment, a paste for production of a negative electrode is prepared using the method of producing a paste for production of a negative electrode according to the present embodiment described above. The description thereof will not be repeated here.

[Process (2) of Forming Negative Electrode Using Obtained Paste for Production of Negative Electrode]

In the process (2) of forming a negative electrode, a current collector 101 is coated with the paste for production of a negative electrode obtained from the process (1) and dried and a negative electrode active material layer 103 is formed, thereby obtaining the negative electrode 100 for a lithium ion secondary battery having the negative electrode active material layer 103 formed on the current collector 101.

A known method can be typically used as the method of coating the current collector 101 with the paste for production of a negative electrode. Examples thereof include a reverse roll method, a direct roll method, a doctor blade method, a knife method, an extrusion method, a curtain method, a gravure method, a bar method, a dipping method, and a squeezing method.

The paste for production of a negative electrode may be applied to only one surface or both surfaces of the current collector 101. In a case where both surface of the current collector 101 is coated with the paste for production of a negative electrode, both surfaces may be coated sequentially or simultaneously. Further, the surfaces of the current collector 101 may be coated continuously or intermittently. The thickness, the length, and the width of the coated layer can be suitably selected depending on the size of the battery.

A known method can be typically used as the method of drying the applied paste for production of a negative electrode. Particularly, hot air, vacuum, infrared rays, far infrared rays, electron beams, and cold wind may be used alone or in combination. The drying temperature is typically equal to or higher than 30° C. and equal to or lower than 350° C.

The current collector 101 used for production of a negative electrode according to the present embodiment is not particularly limited as long as the current collector is a typical current collector which can be used for a lithium ion secondary battery, but copper is preferable from the viewpoints of the current, availability, and electrochemical stability. Further, the shape of the current collector 101 is not particularly limited and a foil-like current collector having a thickness of 0.001 to 0.5 mm can be used.

The negative electrode 100 for a lithium ion secondary battery according to the present embodiment may be pressed as necessary. A known method can be typically used as the method of pressing. Examples thereof include a mold pressing method and a calender pressing method. The pressing pressure is not particularly limited, but is typically in a range of 0.2 to 3 t/cm$^2$.

The thickness or the density of the negative electrode active material layer 103 according to the present embodiment is not particularly limited because the thickness or the density thereof can be suitably determined depending on the applications of the battery. Further, the thickness or the density thereof can be set based on typically known information.

<Negative Electrode for Lithium Ion Secondary Battery>

The negative electrode 100 for a lithium ion secondary battery according to the present embodiment can be obtained by the method of producing the negative electrode 100 for a lithium ion secondary battery described above.

<Lithium Ion Secondary Battery>

Next, a lithium ion secondary battery 150 according to the present embodiment will be described. FIG. 2 is a cross-sectional view illustrating an example of the structure of the lithium ion secondary battery 150 according to the embodiment of the present invention. The lithium ion secondary battery 150 according to the present embodiment includes at least the negative electrode 100 for a lithium ion secondary battery which is obtained by the method of producing a negative electrode for a lithium ion secondary battery described above; an electrolyte 110; and a positive electrode 130.

The lithium ion secondary battery 150 of the present embodiment can be prepared according to a known method.

For example, a laminate or a wound body can be used as an electrode. A metal exterior body or an aluminum laminate exterior body can be suitably used as an exterior body. The battery may have a shape of a coin, a button, a sheet, a cylinder, a square, or a plane.

(Positive Electrode)

A positive electrode active material used for the lithium ion secondary battery according to the present embodiment is suitably selected depending on the applications thereof, but a material with high electron conductivity is preferable such that lithium ions can be reversibly released or stored and electron transport can be easily performed. Examples thereof include a composite oxide of lithium and transition metal such as a lithium nickel composite oxide, a lithium cobalt composite oxide, a lithium manganese composite oxide, and a lithium-manganese-nickel composite oxide; a transition metal sulfide such as $TiS_2$, FeS, or $MoS_2$; a transition metal oxide such as MnO, $V_2O_5$, $V_6O_{13}$, or $TiO_2$; and an olivine type lithium phosphorus oxide.

The olivine type lithium phosphorus includes at least one element selected from the group consisting of Mn, Cr, Co, Cu, Ni, V, Mo, Ti, Zn, Al, Ga, Mg, B, Nb, and Fe; lithium; phosphorus; and oxygen. In these compounds, some elements may be partially substituted with other elements in order to improve the characteristics thereof.

Among these, an olivine type lithium iron phosphorus oxide, a lithium cobalt composite oxide, a lithium nickel composite oxide, a lithium manganese composite oxide, and a lithium-manganese-nickel composite oxide are preferable. These positive electrode active materials have a large capacity and a high energy density in addition to a high action potential.

For example, aluminum foil can be used as the positive electrode current collector.

In addition, the positive electrode 130 of the present embodiment can be produced according to a known production method.

(Electrolyte)

As an electrolyte in an electrolytic solution of the battery, known lithium salts can be used and the electrolyte may be selected depending on the type of the active material. Examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and lower fatty acid lithium carboxylate.

The solvent that dissolves an electrolyte is not particularly limited as long as the solvent is typically used as a liquid component that dissolves an electrolyte, and examples thereof include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxy methane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile, nitromethane, formamide, and dimethylformamide; organic acid esters such as methyl formate, methyl acetate, ethyl acetate, butyl acetate, methyl propionate, and ethyl propionate; phosphoric acid trimester or diglymes; triglymes; sulfolanes such as sulfolane and methyl sulfolane; oxazolidinones such as 3-methyl-2-oxazolidinone; and sultones such as 1,3-propanesulfone, 1,4-butanesultone, and naphtha sultone. These may be used alone or in combination of two or more kinds thereof.

(Separator)

As a separator, a porous separator may be exemplified. Examples of the form of the separator include a membrane, a film, and non-woven fabric.

Examples of the porous separator include a polyolefin-based porous separator such as a polypropylene-based separator or a polyethylene-based separator; and a porous separator formed by polyvinylidene fluoride, polyethylene oxide, polyacrylonitrile, or a polyvinylidene fluoride hexafluoropropylene copolymer.

Hereinbefore, the embodiments of the present invention have been described, but these are merely examples of the present invention. Further, various other configurations can be employed.

Further, the present invention is not limited to the embodiments described above and modifications and improvements in a range in which the object of the present invention can be achieved are included in the scope of the present invention.

EXAMPLES

Hereinafter, the present invention will be described with reference to examples and comparative examples, but the present invention is not limited to these.

Example 1

<Preparation of Paste for Production of Negative Electrode>

(1) Process (A)

Hereinafter, the average particle diameter $d_{50}$ was measured using an MT3000 device (manufactured by Microtrac Inc.), the specific surface area was acquired using Quanta Sorb (manufactured by Quantachrome Corporation) according to a nitrogen adsorption BET method. In addition, the hardness R was measured using the above-described method.

960 g of graphite (average particle diameter $d_{50}$: 16 μm, specific surface area obtained by nitrogen adsorption BET method: 3.4 $m^2$/g, hardness R: 0.93 t/$cm^2$) coated with carbon having an amorphous surface, 10 g of carboxymethyl cellulose (CMC) in a powder state; and 10 g of carbon black (specific surface area obtained by nitrogen adsorption BET method: 60 $m^2$/g), as a conductive assistant, in which primary particles having a diameter of 30 nm are aggregated in the form of a chain were put into a planetary motion type planetary mixer.

Further, a powder mixture was obtained by performing dry mixing for 60 minutes under conditions of a rotating velocity of 0.20 m/sec, a revolution velocity of 0.063 m/sec, a temperature of 20° C., and −0.10 MPa.

Here, the graphite coated with carbon having an amorphous surface was prepared in the following manner.

Natural graphite having an average particle diameter $d_{50}$ of 16 μm and a specific surface area of 3.4 $m^2$/g was used as a core material.

99.0 parts by mass of natural graphite powder and 1.0 part by mass of coal-based pitch powder were mixed in a solid phase through simple mixing using a V blender. The obtained mixed powder was put into a graphite crucible and subjected to a heat treatment at 1300° C. for 1 hour under a nitrogen stream.

(2) Blending Process (B1)

Next, water was added to the planetary motion type planetary mixer in which the above-described process (A) was finished such that the solid content concentration of the paste precursor to be obtained was set to 62.0% by mass. Thereafter, water was blended with the powder mixture by performing wet mixing for 2 minutes under conditions of a rotating velocity of 0.15 m/sec, a revolution velocity of 0.04 m/sec, and a temperature of 20° under atmospheric pressure.

(3) Solid Kneading Process (B2)

Next, a paste precursor was obtained by performing wet mixing for 40 minutes under conditions of a rotating velocity of 4.50 m/sec, a revolution velocity of 1.50 m/sec, and a temperature of 20° under atmospheric pressure.

(4) Process (C)

Next, a SBR aqueous solution having a solid content concentration of 40% by mass, which was formed by dispersing styrene butadiene rubber (SBR) in water, was prepared. 50 g of the obtained SBR aqueous solution was added to the planetary motion type planetary mixer in which the solid kneading process (B2) was finished.

Thereafter, wet mixing was performed for 10 minutes under conditions of a rotating velocity of 0.25 m/sec, a revolution velocity of 0.08 m/sec, and a temperature of 20° under atmospheric pressure.

(5) Process (D)

Next, a paste for production of a negative electrode was obtained by performing vacuum defoaming.

<Preparation of Negative Electrode>

Both surfaces of copper foil serving as a current collector was coated with the obtained paste for production of a negative electrode using a die coater and then dried. Next, the obtained electrode was pressed, thereby obtaining a negative electrode.

<Evaluation>

(Presence of Pinholes in Negative Electrode)

The presence of pinholes in the surface of the obtained negative electrode was observed using a scanning electron microscope. The obtained results are listed in Table 1.

(Presence of Cracks or Chips in Negative Electrode Active Material)

The presence of cracks or chips of the negative electrode active material present in the surface of the obtained negative electrode was observed using a scanning electron microscope. The obtained results are listed in Table 1.

Example 2

Respective evaluations were performed by performing production under the same conditions as in Example 1 except that surface-coated graphite (average particle diameter $d_{50}$: 18 μm, specific surface area obtained by nitrogen adsorption BET method: 2.5 m²/g, hardness R: 0.91 t/cm²) was used as the negative electrode active material. The obtained results are listed in Table 1.

Example 3

Respective evaluations were performed by performing production under the same conditions as in Example 1 except that surface-coated graphite (average particle diameter $d_{50}$: 21 μm, specific surface area obtained by nitrogen adsorption BET method: 3.2 m²/g, hardness R: 0.93 t/cm²) was used as the negative electrode active material. The obtained results are listed in Table 1.

Example 4

Respective evaluations were performed by performing production under the same conditions as in Example 1 except that surface-coated graphite (average particle diameter $d_{50}$: 17 μm, specific surface area obtained by nitrogen adsorption BET method: 2.9 m²/g, hardness R: 0.61 t/cm²) was used as the negative electrode active material. The obtained results are listed in Table 1.

Comparative Example 1

Respective evaluations were performed by performing production under the same conditions as in Example 1 except that the process (A) was performed under atmospheric pressure. The obtained results are listed in Table 1.

TABLE 1

|  | Presence of pinholes | Presence of cracks or chips of negative electrode active material |
|---|---|---|
| Example 1 | Absent | Absent |
| Example 2 | Absent | Absent |
| Example 3 | Absent | Absent |
| Example 4 | Absent | Present |
| Comparative Example 1 | Present | Absent |

This application claims the priority based on Japanese Patent Application No. 2014-261266, filed on Dec. 24, 2014, the entire contents of which are incorporated herein by reference.

The invention claimed is:

1. A method of producing a paste for production of a negative electrode of a lithium ion secondary battery, the paste containing a negative electrode active material, a thickening agent, and an aqueous binder, the method comprising:
   a process (A) of preparing a mixture containing the negative electrode active material and the thickening agent by dry mixing the negative electrode active material and the thickening agent in a powder state under reduced pressure;
   a process (B) of preparing a paste precursor by adding one or two or more kinds of liquid components selected from an aqueous medium and an emulsion aqueous solution containing the aqueous binder to the mixture and wet mixing the mixture; and
   a process (C) of preparing the paste for production of a negative electrode by further adding one or two or more kinds of liquid components selected from the aqueous medium and the emulsion aqueous solution containing the aqueous binder to the paste precursor and wet mixing the mixture,
   wherein the negative electrode active material contains a graphite material,
   wherein the aqueous binder contains styrene butadiene rubber,
   wherein the thickening agent contains at least one selected from the group consisting of carboxymethyl cellulose, an ammonium salt of carboxymethyl cellulose, and an alkali metal salt of carboxymethyl cellulose, and
   wherein the dry mixing in the process (A) is performed under a condition of a reduced pressure of −0.01 MPa or less,
   wherein a solid content concentration of the paste precursor is adjusted to be equal to or greater than 55.0% by mass and equal to or less than 65.0% by mass in the process (B),
   wherein the process (B) includes a blending process (B1) and a solid kneading process (B2), and a rotating velocity of a wet mixing in the solid kneading process (B2) is set to be greater than the rotating velocity of a wet mixing in the blending process (B1),
   wherein a rotating velocity of the wet mixing in the process (C) is set to be lower than the rotating velocity of the wet mixing in the solid kneading process (B2), and
   wherein when a total amount of a solid content of the paste for production of a negative electrode is considered to be 100 parts by mass: an amount of the negative electrode active material is equal to or greater than 94 parts by mass and equal to or less than 98.9 parts by mass, an amount of the thickening agent is equal to or greater than 0.5 parts by mass and equal to or less than 2.0 pans by mass, and an amount of the aqueous binder is equal to or greater than 0.5 parts by mass and equal to or less than 3.0 parts by mass.

2. The method of producing a paste for production of a negative electrode according to claim 1,
   wherein a hardness (R) of the negative electrode active material to be measured by the following procedures (1) and (2) is 0.70 t/cm² or greater:

(1) a cylinder having a diameter of 3 cm and a height of 15 cm is filled with 30 g of powder of the negative electrode active material, and (2) a pressure is applied to the powder of the negative electrode active material filling the cylinder and the pressure when a filling density of the negative electrode active material becomes 1.50 g/cm$^3$ is set as the hardness (R) of the negative electrode active material.

3. A method of producing a negative electrode for a lithium ion secondary battery, the negative electrode containing a negative electrode active material, a thickening agent, and an aqueous binder, the method comprising:

a process of preparing a paste for production of a negative electrode according to the method of producing a paste for production of a negative electrode according to claim 1; and a process of forming a negative electrode using the obtained paste for production of a negative electrode.

4. A negative electrode for a lithium ion secondary battery which is obtained by the method of producing a negative electrode for a lithium ion secondary battery according to claim 3.

5. A lithium ion secondary battery comprising at least:

the negative electrode for a lithium ion secondary battery according to claim 4;

an electrolyte; and a positive electrode.

\* \* \* \* \*